Sept. 16, 1958
A. NORRIS ET AL
2,851,903
MUD PUMP PISTON ROD WEARING SLEEVE
Filed April 25, 1955
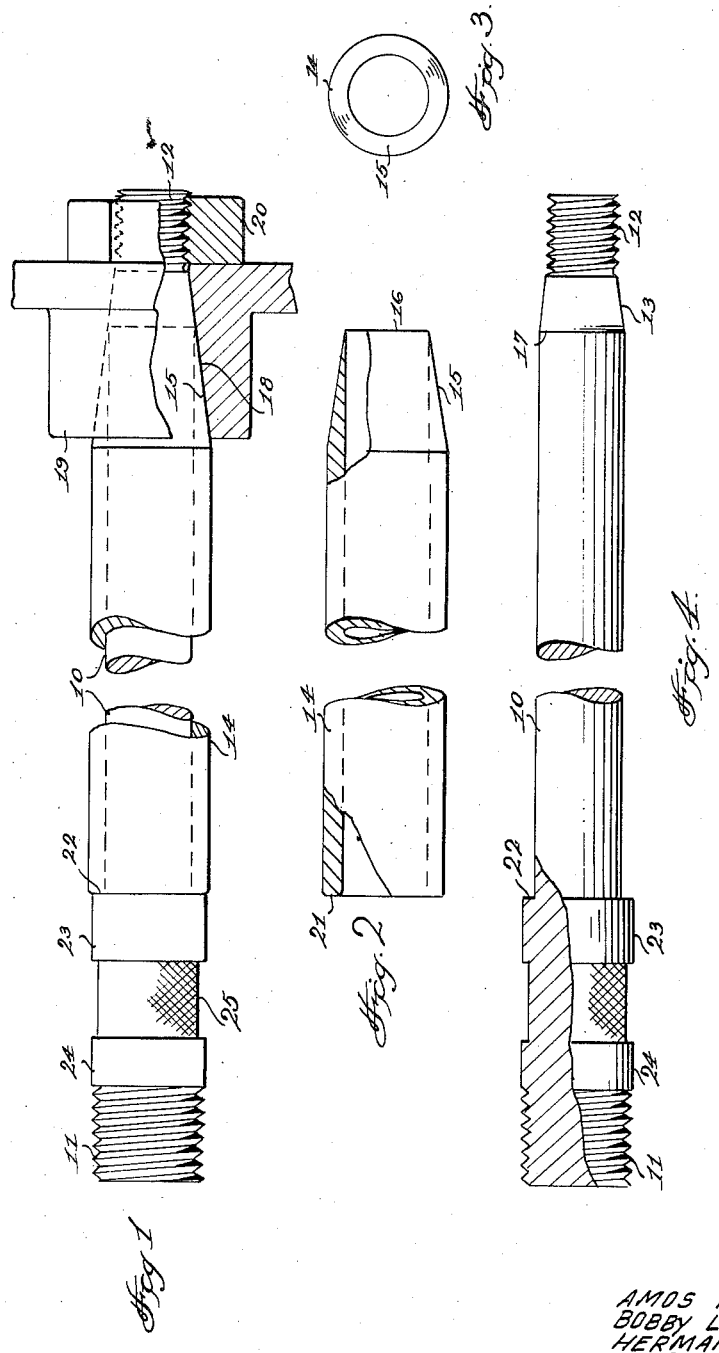
INVENTORS
AMOS NORRIS,
BOBBY L. NORRIS &
HERMAN T. EHRLICH
BY *Victor J. Evans & Co.*
ATTORNEYS

United States Patent Office 2,851,903
Patented Sept. 16, 1958

2,851,903
MUD PUMP PISTON ROD WEARING SLEEVE

Amos Norris, Bobby L. Norris, and Herman T. Ehrlich, Great Bend, Kans., assignors of one-fourth to Dalton Marten, Winfield, Kans.

Application April 25, 1955, Serial No. 503,459

4 Claims. (Cl. 74—579)

This invention relates to mud pumps particularly adapted for use in oil fields, and in particular, a piston rod for a mud pump in which the wearing portion of the rod is provided with a removable sleeve so that the usual wear is taken by the sleeve, which may readily be removed and replaced and the life of the rod is indefinite.

The purpose of this invention is to obviate removing and replacing piston rods of mud pumps by providing wearing sleeves on the rods which may be removed and replaced without pulling the piston rods from the pumps.

Piston rods of conventional mud pumps used in the oil fields are subjected to stresses and strains that cause rapid wear and when a rod wears substantially $\frac{1}{32}''$, it is removed and replaced and the rod removed is discarded. Such rods are comparatively costly and to remove and replace a rod necessitates shutting down the pump approximately three hours. With this thought in mind, this invention contemplates providing a wearing sleeve on a piston rod of a mud pump whereby the wear is taken by the sleeve so that the life of the rod is indefinite and as the sleeve can be removed and replaced without pulling the rod from the pump the time required to change the sleeve is approximately thirty minutes as compared with three hours required to remove and replace the piston rod. Consequently, the improved piston rod of this invention saves considerable time and reduces the cost of replacing the complete rod approximately fifty percent.

The object of this invention is, therefore, to provide means for providing a removable wearing surface on a pump piston rod whereby the life of the rod is indefinitely extended and whereby the wearing surface is adapted to be readily removed and replaced.

Another object of the invention is to provide an improved piston rod for mud pumps and the like in which the rod is covered with a wearing sleeve and in which the improved rod with the wearing sleeve is adapted to be used in place of conventional piston rods in mud pumps and the like.

A further object of the invention is to provide a removable wearing surface for piston rods of mud pumps and the like in which the improved piston rods are of simple and economical construction.

With these and other objects and advantages in view, the invention embodies an elongated piston rod having a threaded end with spaced collars separated by a knurled wrench gripping surface extended from the threads and having a threaded stud extended from a tapering surface at the opposite end and a sleeve positioned over the body of the rod and having a tapering end surface of the same taper as that of the end of the rod and adapted to be positioned with the meeting point of the tapering surfaces of the sleeve and rod covered by the taper head for sealing the connection between the sleeve and rod, the rod and sleeve being clamped in the taper head by a nut threaded on the stud extended from the tapering end of the rod.

Other features and advantages of the invention will appear from the following description, taken in connection with the accompanying drawing, wherein:

Figure 1 is a side elevational view of the improved pump piston rod with parts broken away and with parts of a taper head in which the rod is held and also a clamping nut shown in section.

Figure 2 is a side elevational view of the wearing sleeve adapted to be positioned on the piston rod, parts of the sleeve being broken away and parts shown in section.

Figure 3 is an end elevational view of the wearing sleeve looking toward the end on which the tapering surface is positioned.

Figure 4 is a side elevational view of the improved piston rod, parts being broken away and parts shown in section.

Referring now to the drawing, wherein like reference characters denote corresponding parts, the improved pump piston rod of this invention includes an elongated cylindrical section 10 having threads 11 on one end and a threaded stud 12 extending from a tapering section 13 at the opposite end, a sleeve 14 adapted to be positioned on the cylindrical section 10 of the rod and having a tapering end surface 15, of the same taper as that of the surface 13 of the rod adapted to be aligned with said surface with the sleeve 14 positioned on the section 10 of the rod and with an end 16 of the sleeve positioned at a point 17 whereby the tapering surface 15 provides a continuation of the surface 13.

The tapering surfaces 13 and 15 are designed to meet at the point 17 which is positioned in the intermediate part of a tapering opening 18 in a taper head 19 of a piston whereby the taper head seals the connection between the rod and sleeve and wherein the tapering surfaces are clamped in assembled relation by a nut 20 threaded on the stud 12 extended from the end of the piston rod.

The opposite end 21 of the sleeve 14, which is provided with an arcuate surface, is clamped against a shoulder 22 at the end of a collar 23, the collar 23 being spaced from a collar 24 at the inner end of the threads 11 and the collars 23 and 24 being spaced by a knurled surface 25 that provides a gripping surface for a wrench or the like.

With the parts of the piston rod designed and assembled as disclosed and described, an improved piston rod is provided in which the body of the rod is protected by a wearing sleeve that takes all wear so that the life of the rod is indefinite and with the sleeve positioned over the rod, as shown and described, the sleeve may readily be removed and replaced without pulling the rod from the pump.

It will be understood that modifications, within the scope of the appended claims, may be made in the design and arrangement of the parts without departing from the spirit of the invention.

What is claimed is:

1. A piston rod for use in a pump comprising an elongated cylindrical body, threaded at one end and having a collar positioned at the inner end of the threaded portion, and having a tapering surface with a threaded stud extended therefrom on the opposite end, and a sleeve having a tapering end surface adapted to be installed on the cylindrical body, with the end opposite to that on which the tapering surface is positioned against the collar, and with the tapering surface thereof in alignment with the tapering surface on the end of the cylindrical body.

2. In a piston rod for a mud pump, the combination which comprises an elongated cylindrical body having spaced collars and a threaded surface at one end and having a tapering surface with a threaded stud extended therefrom at the opposite end, the diameter of said collars and threaded section being greater than that of the cylindrical body and said body having a knurled surface between said collars, and a wearing sleeve having a tapering end surface of the same taper as that of the tapering surface at the end of the cylindrical body extended over the cylindrical body with the end opposite to that on which the tapering surface is positioned against the end surface of one of said collars and with the tapering surface thereof in alignment with the tapering surface of the cylindrical body, thereby providing a continuous seat for a conical-shaped opening in an inner hub of a piston.

3. In a piston rod for a mud pump, the combination which comprises an elongated cylindrical body having spaced collars and a threaded surface at one end and having a tapering surface with a threaded stud extended therefrom at the opposite end, the diameter of said collars and threaded section being greater than that of the cylindrical body and said body having a knurled surface between said collars, and a wearing sleeve having a tapering end surface of the same taper as that of the tapering surface at the end of the cylindrical body extended over the cylindrical body with the end opposite to that on which the tapering surface is positioned against the end surface of one of said collars and with the tapering surface thereof in alignment with the tapering surface of the cylindrical body whereby with the piston rod positioned in a taper head, the meeting point of the tapering surfaces of the sleeve and body is positioned intermediate of the length of the taper head whereby the parts are adapted to be clamped in the taper head of a piston by a nut threaded on the threaded stud of the cylindrical body.

4. A mud pump piston rod sleeve comprising a hollow cylindrical body having a frustro-conical shaped surface at one end with said surface tapering from the outside diameter of the body to the inside diameter thereof, said tapering surface being in alignment with the tapering surface of a piston rod upon which the sleeve is positioned whereby a continuous frustro-conical shaped surface is provided which forms a seat for the hub of a piston from which the piston rod extends.

References Cited in the file of this patent

UNITED STATES PATENTS

| | | |
|---|---|---|
| Re. 21,114 | Suhm et al. | June 13, 1939 |
| 1,348,692 | Bell | Aug. 3, 1920 |
| 2,164,159 | Millmine | June 27, 1939 |
| 2,274,927 | Lankford | Mar. 3, 1942 |
| 2,470,540 | Young | May 17, 1949 |

FOREIGN PATENTS

| | | |
|---|---|---|
| 327,944 | Germany | Oct. 19, 1920 |
| 731,554 | Germany | Feb. 11, 1943 |